US012558904B2

(12) United States Patent
Sarkinen et al.

(10) Patent No.: US 12,558,904 B2
(45) Date of Patent: Feb. 24, 2026

(54) DROP-ON-DEMAND INK DELIVERY SYSTEMS AND METHODS WITH TANKLESS RECIRCULATION FOR CARD PROCESSING SYSTEMS

(71) Applicant: Entrust Corporation, Shakopee, MN (US)

(72) Inventors: Daniel Sarkinen, Shakopee, MN (US); Brian O'Dell, Shakopee, MN (US); Randy Jordan, Shakopee, MN (US); Andrew Luu, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 729 days.

(21) Appl. No.: 17/094,553

(22) Filed: Nov. 10, 2020

(65) Prior Publication Data

US 2021/0138795 A1 May 13, 2021

Related U.S. Application Data

(60) Provisional application No. 62/933,605, filed on Nov. 11, 2019.

(51) Int. Cl.

| | |
|---|---|
| ***B41J 2/185*** | (2006.01) |
| ***B41J 2/175*** | (2006.01) |
| ***B41J 3/407*** | (2006.01) |
| ***B41M 5/00*** | (2006.01) |

(52) U.S. Cl.
CPC ............... *B41J 2/185* (2013.01); *B41J 2/175* (2013.01); *B41J 3/407* (2013.01); *B41M 5/0047* (2013.01); *B41M 5/0064* (2013.01)

(58) Field of Classification Search
None
See application file for complete search history.

(56) References Cited

U.S. PATENT DOCUMENTS

| | | | | |
|---|---|---|---|---|
| 3,099,211 A * | 7/1963 | Hilgoe | .................... | B41F 31/08 248/140 |
| 4,413,267 A | 11/1983 | Hein | | |
| 4,825,054 A | 4/1989 | Rust et al. | | |

(Continued)

FOREIGN PATENT DOCUMENTS

| | | |
|---|---|---|
| CN | 1342116 A | 3/2002 |
| CN | 203792900 U | 8/2014 |

(Continued)

OTHER PUBLICATIONS

International Search Report and Written Opinion, International Patent Application No. PCT/IB2020/060591, Feb. 2, 2021 (13 pages).

(Continued)

*Primary Examiner* — Alejandro Valencia
(74) *Attorney, Agent, or Firm* — Merchant & Gould P.C.

(57) ABSTRACT

DOD ink delivery systems and methods are described herein that are used in DOD card printing systems of card processing systems for supplying ink for DOD printing on plastic cards. The ink delivery systems are configured to recirculate the ink without using a recirculation tank separate from an ink supply. The ink can be recirculated back into the ink supply or, when the ink supply is not present, the ink can be recirculated from a return header tank to a supply header tank.

11 Claims, 4 Drawing Sheets

(56) References Cited

U.S. PATENT DOCUMENTS

| | | | |
|---|---|---|---|
| 4,995,501 A | 2/1991 | Lundstrom et al. | |
| 5,266,781 A | 11/1993 | Warwick et al. | |
| 5,367,328 A | 11/1994 | Erickson | |
| 5,837,991 A | 11/1998 | LaManna et al. | |
| 5,980,011 A | 11/1999 | Cummins et al. | |
| 6,131,817 A | 10/2000 | Miller | |
| 6,695,205 B1 | 2/2004 | Lundstrom et al. | |
| 6,783,067 B2 | 8/2004 | Kreuter et al. | |
| 6,902,107 B2 | 6/2005 | Shay et al. | |
| 8,070,248 B2 | 12/2011 | Ogama et al. | |
| 8,408,685 B2 | 4/2013 | Delueg | |
| 8,523,336 B2 | 9/2013 | Kuribayashi | |
| 9,227,420 B1 | 1/2016 | Nakamura | |
| 9,523,011 B2 | 12/2016 | Robello et al. | |
| 10,479,101 B2 | 11/2019 | Inada et al. | |
| 11,192,375 B2 | 12/2021 | Sarkinen | |
| 2002/0001024 A1 | 1/2002 | Wouters et al. | |
| 2007/0187870 A1 | 8/2007 | Lundstrom et al. | |
| 2008/0297577 A1 | 12/2008 | Wouters et al. | |
| 2009/0195588 A1 | 8/2009 | Ogama | |
| 2009/0213197 A1 | 8/2009 | Bansyo | |
| 2010/0039486 A1 | 2/2010 | Wouters et al. | |
| 2010/0245495 A1* | 9/2010 | Katada | B41J 2/515 347/85 |
| 2011/0285768 A1 | 11/2011 | Preckel | |
| 2013/0100205 A1* | 4/2013 | Sunouchi | B41J 2/17596 347/37 |
| 2013/0100213 A1 | 4/2013 | Kuribayashi | |
| 2013/0169710 A1 | 7/2013 | Keefe et al. | |
| 2014/0063086 A1 | 3/2014 | Morgavi | |
| 2014/0300670 A1 | 10/2014 | Tsukamoto | |
| 2015/0085047 A1* | 3/2015 | Beech | B42D 5/027 347/104 |
| 2015/0368488 A1 | 12/2015 | Robello et al. | |
| 2017/0066246 A1* | 3/2017 | Miyazawa | B41J 2/175 |
| 2018/0272735 A1 | 9/2018 | Takamura | |
| 2018/0326761 A1 | 11/2018 | Wooldridge et al. | |
| 2019/0344565 A1 | 11/2019 | Bontrager et al. | |

FOREIGN PATENT DOCUMENTS

| | | | |
|---|---|---|---|
| CN | 104859310 | A | 8/2015 |
| CN | 106427248 | A | 2/2017 |
| EP | 2416965 | A1 | 2/2012 |
| JP | 2014113816 | A | 6/2014 |
| JP | 2018140520 | | 9/2018 |
| KR | 10-2013-0011589 | A | 1/2013 |
| KR | 10-2014-0075118 | A | 6/2014 |
| WO | 2015/029599 | A1 | 3/2015 |

OTHER PUBLICATIONS

International Search Report and Written Opinion, International Patent Application No. PCT/IB2019/056659, Aug. 5, 2019 (12 pages).

Atlantic Zeiser, "Persomaster EMV Banking Card Personalization System" brochure, Nov. 2019 (6 pages).

Office Action issued in Chinese Patent Application No. 201980064073.8 (7 pages).

Extended European Search Report, European Patent Application No. 19846805.0, Mar. 24, 2022 (7 pages).

Extended European Search Report, European Patent Application No. 20887528.6, Oct. 10, 2023 (11 pages).

Chinese Office Action issued in corresponding Chinese Application No. 202080078440.2, dated Nov. 28, 2023, 15 pages, English translation provided.

* cited by examiner

DROP-ON-DEMAND INK DELIVERY SYSTEMS AND METHODS WITH TANKLESS RECIRCULATION FOR CARD PROCESSING SYSTEMS

FIELD

This disclosure relates to card processing systems that perform drop-on-demand (DOD) printing on plastic cards including, but not limited to, financial (e.g., credit, debit, or the like) cards, driver's licenses, national identification cards, business identification cards, gift cards, and other plastic cards.

BACKGROUND

In DOD printing, ink is ejected from one or more nozzles of a print head by electrically energizing select ones of the nozzles from which the ink is to be ejected. DOD printing on plastic cards in a card processing system presents unique challenges. The printing on the plastic card must be durable and long-lasting, as well as being of very high quality. In addition, the printing can vary from monochromatic using a single color to multi-color using multiple colors such as cyan, magenta, yellow, black and white ink. Further, the card throughput (i.e. the number of cards printed per unit of time) is an important factor in a card processing system that employs DOD printing and efforts are made to maximize the card throughput. Moreover, the printing that occurs on the plastic cards can and often does vary from card to card.

SUMMARY

DOD ink delivery systems and methods are described herein that are used in DOD card printing systems of card processing systems for supplying ink for DOD printing on plastic cards of the type that bear personalized data unique to the intended cardholder and/or which bear other card information. Examples of plastic cards can include, but are not limited to, financial (e.g., credit, debit, or the like) cards, driver's licenses, national identification cards, business identification cards, gift cards, and other plastic cards.

In one embodiment described herein, the DOD ink delivery system is configured to recirculate the ink without using a recirculation tank separate from an ink supply. In one embodiment, the ink supply can be a vessel that the ink is purchased/supplied in and is intended to be disposed of after use. In another embodiment, the ink supply can be any form of single use vessel that is intended to be disposed of after use. A recirculation tank or bulk tank is a fixed component in the system that is designed to be filled with ink from a source of ink, and the tank is not easily removable and is not intended to be discarded after use when the ink runs out. Recirculation is useful for inks that need to be recirculated to improve the resulting performance of the ink when applied to a plastic card. The ink could be an ink with a particulate material in the ink, with the recirculation keeping the particulate adequately dispersed in the ink. Examples of inks with a particulate material include, but are not limited to, white ink and what in the card printing industry are referred to as spot colors that include gold, silver, red colored inks. The ink could also be an ink (with or without particulate material, and possibly either a spot color or not a spot color) that is recirculated in order to remove gas from the ink.

The card processing systems described herein can be any card processing systems that can process plastic cards by printing on the cards using a DOD card printing system having one or more DOD print heads, for example piezo-electric print heads, in combination with one or more of: reading data from and/or writing data to a magnetic stripe on the cards, programming an integrated circuit chip on the cards, emboss characters on the cards, indenting characters on the cards, laminating the cards, using a laser that performs laser processing such as laser marking on the cards, applying a topcoat to a portion of or the entire surface of the cards, checking the quality of personalization/processing applied to the cards, applying a security feature such as a holographic foil patch to the cards, and other card processing operations.

The DOD card printing system used in the card processing system can have a single DOD print head or a plurality of DOD print heads. The DOD print heads can be piezo-electric print heads. The DOD card printing system can perform monochromatic or multi-color printing. In one example of multi-color printing, five DOD print heads, each of which has a plurality of nozzles, can be provided. Each print head can be designated to print a specific color ink, such as cyan, magenta, yellow, black and white (CMYKW). The DOD card printing system can print using any suitable ink (or other material) used in DOD printing and that is suitable for use on the types of plastic cards described herein. For example, the ink can be an ultraviolet (UV) radiation curable ink.

In one embodiment, a drop-on-demand card printing system can include a drop-on-demand print head having an ink inlet and an ink outlet, and an ink delivery system connected to the drop-on-demand print head. The ink delivery system can include a first ink header tank fluidly connected to the ink inlet and a second ink header tank fluidly connected to the ink outlet, and an ink recirculation system defining an ink recirculation path that is configured to permit ink to be recirculated through the first ink header tank and the second ink header tank. The ink recirculation system is devoid of an ink supply tank whereby the recirculating ink is not directed into an ink supply tank after leaving the second ink header tank and before entering the first ink header tank. The drop-on-demand card printing system can also include a vacuum system that is fluidly connected to the first and second ink header tanks and that applies a vacuum to the drop-on-demand print head.

In another embodiment, a method of operating a drop-on-demand card printing system of a card processing system is described. The drop-on-demand card printing system includes an ink delivery system connected to a drop-on-demand print head, where the ink delivery system has a first ink header tank fluidly connected to the ink inlet and a second ink header tank fluidly connected to the ink outlet. The method includes recirculating ink through the first ink header tank and the second ink header tank via the drop-on-demand print head using an ink recirculation system that defines an ink recirculation path that is configured to permit the ink to be recirculated through the first ink header tank and the second ink header tank that is devoid of an ink supply tank in the ink recirculation path whereby the recirculating ink is not directed into an ink supply tank after leaving the second ink header tank and before entering the first ink header tank.

In still another embodiment, a method of operating a drop-on-demand card printing system of a card processing system is described. The drop-on-demand card printing system can include an ink delivery system connected to a drop-on-demand print head, where the ink delivery system has a first ink header tank fluidly connected to the ink inlet, a second ink header tank fluidly connected to the ink outlet, and an ink supply bottle. The method includes pumping ink directly from the ink supply bottle into the first ink header tank when the first ink header tank needs to be supplied with ink, and pumping ink from the second ink header tank directly into the ink supply bottle thereby causing mixing of ink within the ink supply bottle when ink needs to be removed from the second ink header tank.

In still another embodiment, a method of operating a drop-on-demand card printing system of a card processing system is described. The drop-on-demand card printing system can include an ink delivery system connected to a drop-on-demand print head, where the ink delivery system has a first ink header tank fluidly connected to the ink inlet, a second ink header tank fluidly connected to the ink outlet, and a mounting location for mounting an ink supply bottle. The method includes pumping ink directly from the second ink header tank back into the first ink header tank when the ink supply bottle is not present at the mounting location and ink needs to be removed from the second ink header tank.

DRAWINGS

DETAILED DESCRIPTION

Figure 1:
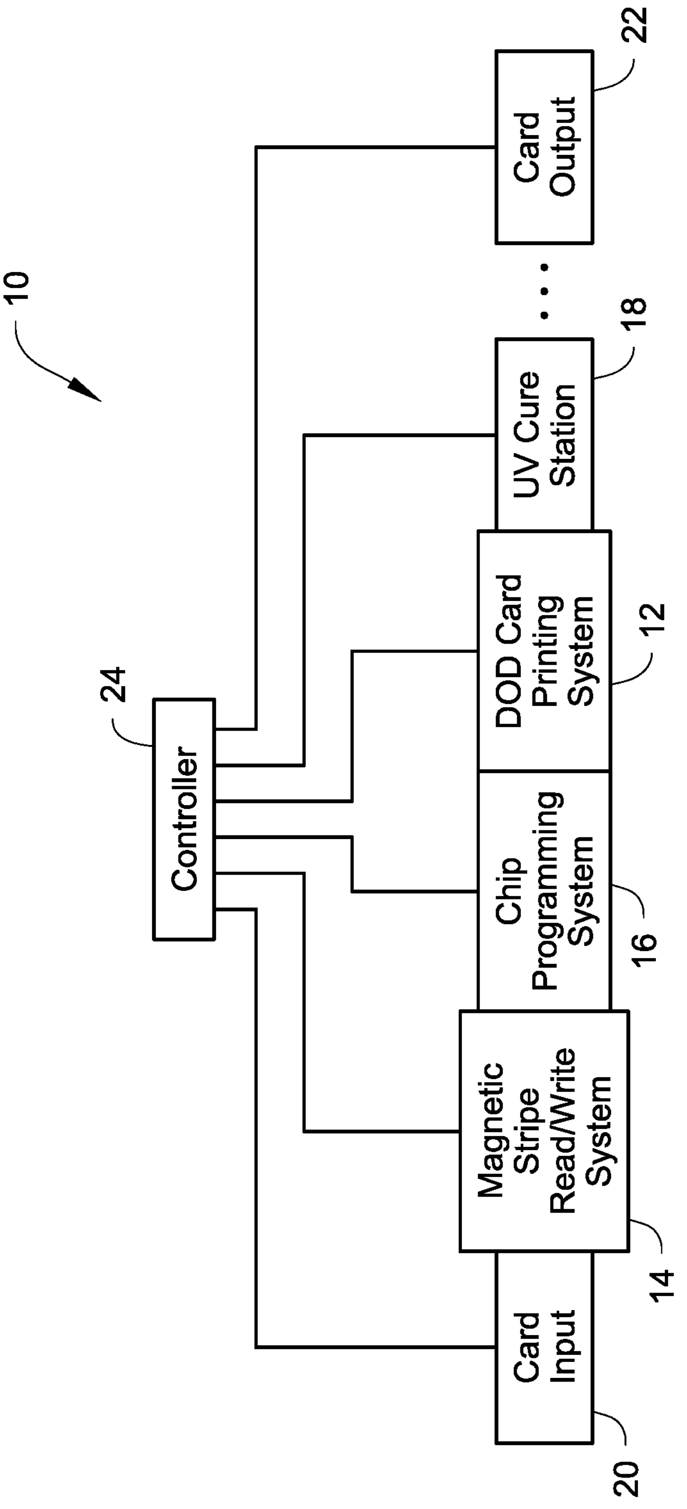
FIG. 1 illustrates an embodiment of a card processing system described herein.

FIG. 1 illustrates an example of a card processing system 10 with which the DOD card printing systems described herein can be used. The DOD card printing systems may alternatively be referred to as DOD printing systems. The system 10 is configured to process cards by at least printing on the cards using at least one DOD card printing system 12 included in the system 10. The system 10 can also include at least one other card processing capability in addition to the printing by the DOD card printing system 12. For example, the additional card processing can include a magnetic stripe read/write system 14 that is configured to read data from and/or write data to a magnetic stripe on the cards, and/or an integrated circuit chip programming system 16 that is configured to program and/or read data from an integrated circuit chip on the cards. When the DOD card printing system 12 prints using ultraviolet (UV) curable ink, a UV cure station 18 can also be provided. The construction and operation of the systems 14, 16, 18 are well known in the art. Magnetic stripe read/write systems and integrated circuit chip programming systems are disclosed, for example, in U.S. Pat. Nos. 6,902,107 and 6,695,205, and can be found in the MX family of central issuance systems available from Entrust Corporation of Shakopee, Minn. An example of a UV radiation applicator in a card printing system is the MX8100™ Card Issuance System available from Entrust Corporation of Shakopee, Minn.

The cards to be processed within the card processing system 10 include, but are not limited to, plastic cards which bear personalized data unique to the intended cardholder and/or which bear other card information. Examples of plastic cards can include, but are not limited to, financial (e.g., credit, debit, or the like) cards, driver's licenses, national identification cards, business identification cards, gift cards, and other plastic cards.

In some embodiments, the DOD card printing systems 12 described herein can be used to print on substrates other than plastic cards, such as paper substrates, in which case the DOD card printing systems 12 can be referred to as DOD printing systems.

In the system 10 illustrated in FIG. 1, a card input 20 is provided that is configured to hold a plurality of cards waiting to be processed. Cards are fed one-by-one from the card input 20 into the rest of the system 10 where each card is individually processed. Processed cards are ultimately transported into a card output 22 that is configured to hold a plurality of the processed cards.

Operation of the various systems 12, 14, 16, 18, 20, 22 is controlled by one or more controllers 24. Alternatively, each one of the system 12, 14, 16, 18, 20, 22, or select ones of the systems 12, 14, 16, 18, 20, 22 can have its own dedicated controller.

The cards can be transported through the card processing system 10 using any suitable mechanical card transport mechanism(s) that are well known in the art of card handling within card processing systems 10. Examples of card transport mechanisms that could be used are known in the art and include, but are not limited to, transport rollers, transport belts (with tabs and/or without tabs), vacuum transport mechanisms, transport carriages, and the like and combinations thereof. Card transport mechanisms are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of card transport mechanisms that could be used, as well as the construction and operation of such card transport mechanisms.

The card processing system 10 illustrated in FIG. 1 is a type of system that can be referred to as a central issuance card processing system. In a central issuance card processing system, the card input 20 and the card output 22 are generally at opposite ends of the system 10 with the card processing mechanisms, such as the systems 12, 14, 16, 18 in FIG. 1, between the card input 20 and the card output 22. A central issuance card processing system is typically designed for large volume batch processing of cards, often employing multiple processing stations or modules to process multiple cards at the same time to reduce the overall per card processing time. Examples of central issuance card processing systems include the MX family of central issuance systems available from Entrust Corporation of Shakopee, Minn. Other examples of central issuance systems are disclosed in U.S. Pat. Nos. 4,825,054, 5,266,781, 6,783,067, and 6,902,107, all of which are incorporated herein by reference in their entirety. In one example, the card processing system 10 (and the systems 12, 14, 16, 18 therein) can process cards at a rate of at least about 500 cards per hour, or at least about 1000 cards per hour, or at least about 1500 cards per hour, or at least about 2000 cards per hour, or at least about 2500 cards per hour, or at least about 3500 cards per hour, or at least about 4000 cards per hour.

In FIG. 1, the systems 12, 14, 16, 18 can be described as being downstream of the card input 20 and described as being between the card input 20 and the card output 22. The sequence or arrangement of the systems 12, 14, 16, 18 relative to one another and relative to the card input 20 can be varied from the sequence that is illustrated in FIG. 1.

The system 10 may include additional card processing systems not illustrated in FIG. 1, which are well known in the art of card processing and which may also be located between the card input 20 and the card output 22. For example, the system 10 may include a card embossing system that is configured to emboss characters on the cards; an indenting system that is configured to indent characters on the cards; a laminator system that is configured to apply a laminate to the cards; a laser system that uses a laser to perform laser processing such as laser marking on the cards; a topcoat station that is configured to apply a topcoat to a portion of or the entire surface of the cards; a quality control station that is configured to check the quality of personalization/processing applied to the cards; a security station that is configured to apply a security feature such as a holographic foil patch to the cards; and other card processing operations. The additional card processing systems may be located anywhere in the system 10, such as between the UV cure station 18 and the card output 22.

Figure 2:
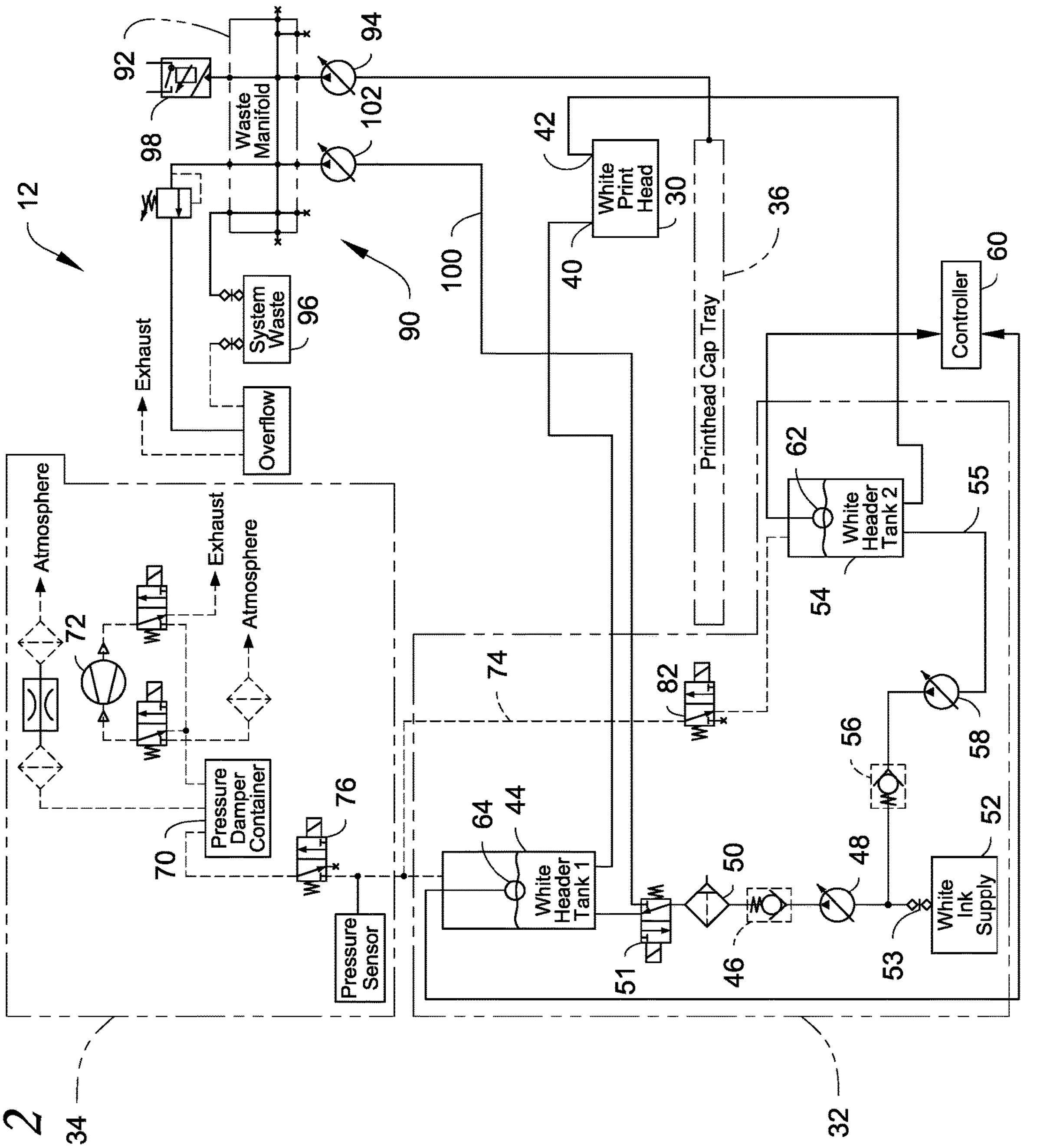
FIG. 2 illustrates an embodiment of a DOD card printing system described herein that can be used with the card processing system.
Figure 3:
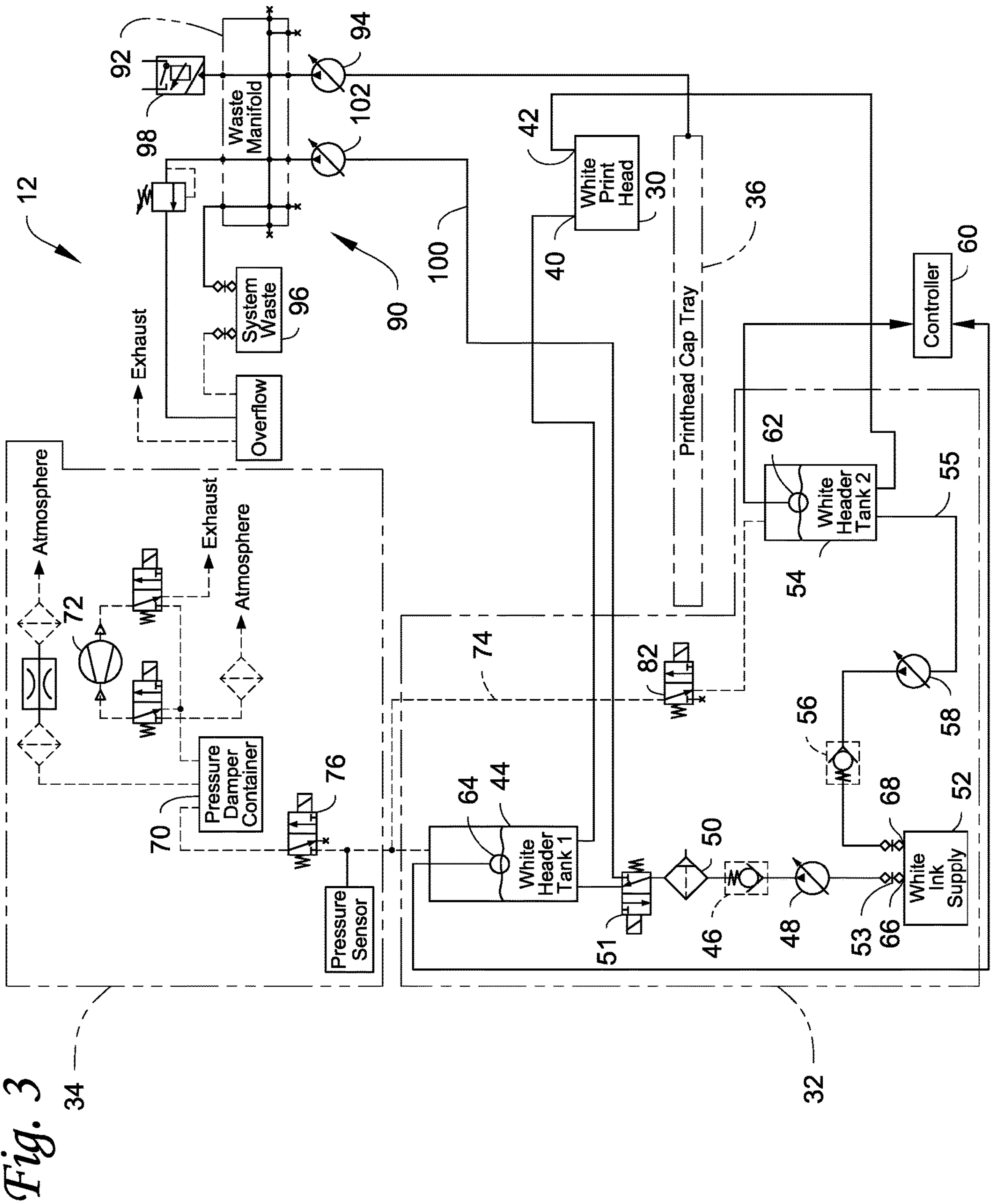
FIG. 3 illustrates another embodiment of a DOD card printing system described herein that can be used with the card processing system.
Figure 4:
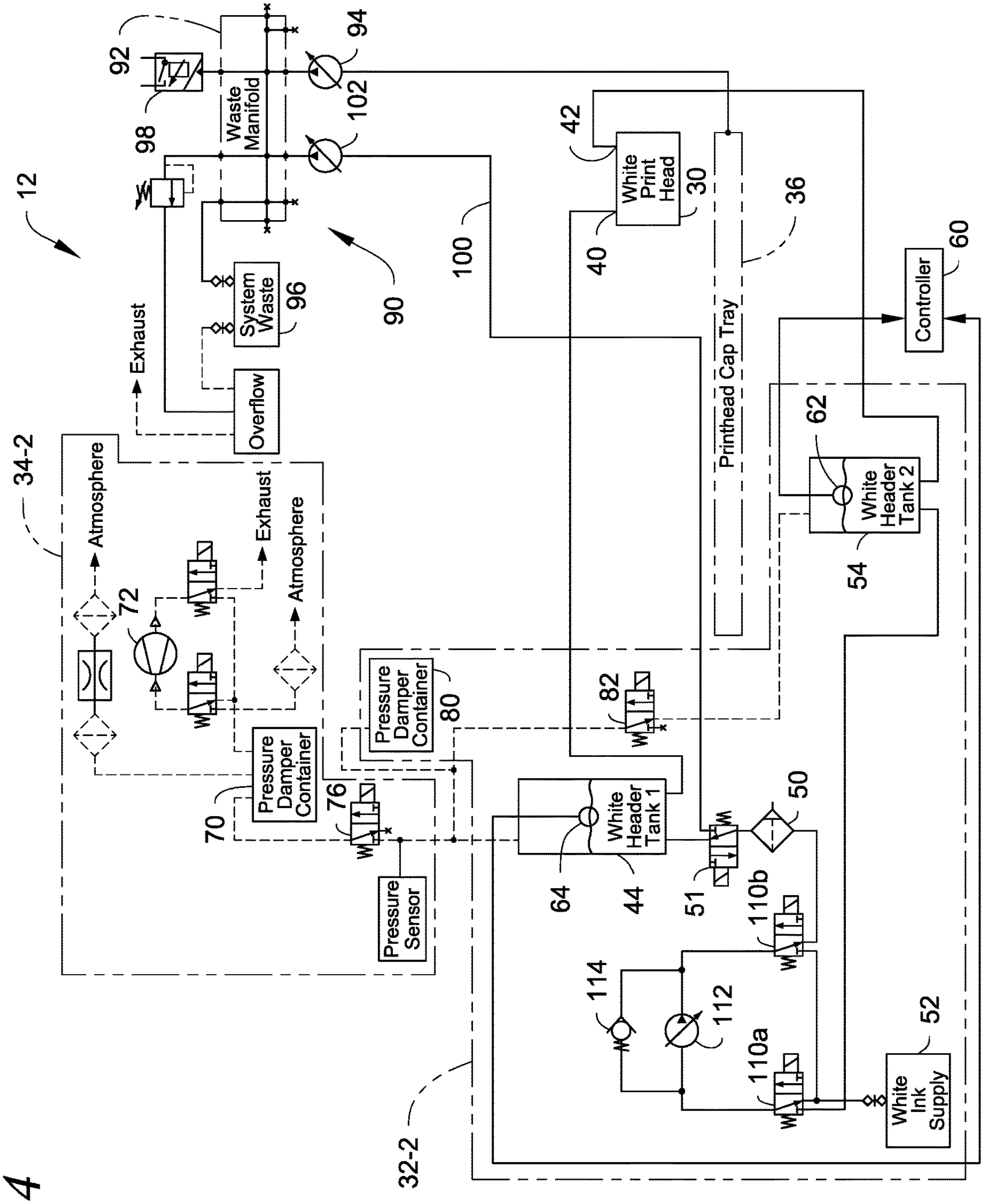
FIG. 4 illustrates another embodiment of a DOD card printing system described herein that can be used with the card processing system.

Non-limiting examples of the DOD card printing system 12 are illustrated in FIGS. 2-4. Other examples are possible. The general construction and operation of DOD card printing systems is well-known in the art. One example of a conventional DOD card printing system is found in the MX8100™ Card Issuance System available from Entrust Corporation of Shakopee, Minn.

Each of the DOD card printing systems 12 in FIGS. 2-4 includes at least one DOD print head 30, an ink delivery system 32 connected to the DOD print head 30, and a vacuum system 34 for applying a vacuum to the DOD print head 30. In addition, each system 12 can include a cap tray 36 that is selectively positionable underneath the DOD print head(s) 30 and that is configured to be movable between a covering position directly under the DOD print head(s) 30 and a non-covering position during printing operations. The cap tray 36 is also configured to collect ink that may be discharged from the DOD print head(s) 30 when the cap tray 36 is in the covering position.

The printing performed by the DOD card printing system 12 can be monochromatic using a single color or multi-color using two or more colors. If multiple print heads are used, the print heads are arranged generally side-by-side to sequentially print onto a surface of a card as the card is transported past the print heads, for example underneath the print heads. The DOD print head(s) 30 can print using any suitable ink or coating (such as a varnish) used in DOD printing and that is suitable for use on the types of plastic cards described herein. For example, the ink can be a UV curable ink, a heat curable ink that can be cured by applying heat to the heat curable ink, or other ink or other materials that can be deposited by a DOD print head. An example of a DOD printer that prints using UV curable ink in a card printing system is the MX8100™ Card Issuance System available from Entrust Corporation of Shakopee, Minn. Each DOD print head 30 can print a specific color ink. The term fluid can be used to refer to any material, such as an ink or coating material, which can be applied to a card surface by the DOD print head 30.

In general, each DOD print head 30 includes a bottom surface that faces downward toward the plastic card to be printed on. A nozzle plate, through which ink is ejected, is provided on a portion of the bottom surface. The nozzle plate includes a plurality of openings therein, each opening being associated with a nozzle of the print head from which ink is ejected. Each DOD print head 30 can be a piezo-electric print head which requires electrical energy to energize the print head and dispense ink. The general mechanical construction and operation of piezo-electric print heads is well-known in the art.

Referring to FIG. 2, a first embodiment of the DOD card printing system 12 will be described. In the embodiment of FIG. 2, the system 12 includes a single print head 30. The system 12 is also provided with a recirculation system as part of the ink delivery system 32 that provides recirculation of the ink (or other material) to be ejected from the print head 30. To help in describing the concepts illustrated in the system 12 in FIG. 2, the material discharged by the single print head 30 will be described and illustrated as being white ink. As described above, white ink used in DOD card printing typically contains particulate material therein, so the white ink is recirculated to help keep the particulate material adequately dispersed in the white ink. However, the material discharged by the print head 30 is not limited to white ink and can be any material where it is beneficial to recirculate the material including, but not limited to, spot colors such as gold, silver, and red colored inks, ink that is recirculated in order to remove gas from the ink, coating material, and other fluids that can be applied by the DOD print head 30 to a card surface.

The print head 30 includes an inlet 40 connected to a supply side of the ink delivery system 32 and an outlet 42 connected to a recirculation side of the ink delivery system 32. The outlet 42 is distinct from the discharge nozzles from which ink is discharged during a printing operation and which are typically located at the bottom of the print head 30. On the supply side, the inlet 40 is fluidly connected to a first header tank 44 which contains an amount of the white ink and provides a constant supply of white ink to the print head 30. The supply side further includes a supply pump 48 that pumps the white ink into the header tank 44, a filter 50 between the supply pump 48 and the header tank 44 that filters the white ink, and a white ink supply bottle 52 that contains a supply of the white ink. The supply pump 48 is depicted as being a variable displacement pump. However, the supply pump 48 can have any construction that is suitable to allow the pump to perform the functions of the supply pump 48. In addition, a one-way check valve 46 is disposed between the supply pump 48 and the filter 50 that permits flow of the white ink toward the header tank 44 but prevents the flow of white ink back toward the supply pump 48. In some embodiments, the check-valve 46 and the supply pump 48 can be combined into a single component. Further, a solenoid valve 51 is provided between the filter 50 and the header tank 44 that can be used to drain the ink from the system via a waste collection system 90 discussed further below.

With continued reference to FIG. 2, on the recirculation side, the outlet 42 is fluidly connected to a second header tank 54 which also contains an amount of the white ink. A recirculation line 55 extends from the second header tank 54 to a return pump 58 (which can also be referred to as a recirculation pump) and from there to a one-way check valve 56 (which can also be referred to as a recirculation check valve). The recirculation line 55 then extends from the check valve 56 to a supply line connected to the inlet of the supply pump 48. The one-way check valve 56 permits flow of the white ink from the return pump 58 but prevents the flow of white ink back toward the return pump 58 and the header tank 54. The return pump 58 is illustrated as being a variable displacement pump. However, the return pump 58 can have any construction that is suitable to allow the pump to perform the functions of the return pump 58. In some embodiments, the check valve 56 may be disposed in the recirculation line 55 between the return pump 58 and the header tank 54.

A controller 60 is provided that is connected to the solenoid valve 51 to control the operation of the valve 51. The controller 60 (or a separate controller) can also be connected to the other controllable valves described herein. The controller 60 (or a separate controller) can also be connected to the pumps described herein to control the operation of the pumps. The controller 60 can be separate from, or the same as, the controller 24 in FIG. 1.

An ink level sensor 62, such as a float sensor, can be provided in the header tank 54 for sensing the level of the ink in the header tank 54, with the sensor 62 providing ink level readings to the controller 60. In addition, an ink level sensor 64, such as a float sensor, can be provided in the header tank 44 for sensing the level of the ink in the header tank 44, with the sensor 64 providing ink level readings to the controller 60. In operation, one or more of the ink level readings in the header tanks 44, 54 can be used to determine when to recirculate ink. For example, the ink level readings from the ink level sensor 62 in the header tank 54 can be used to control the valve 51 and the operation of the pumps 48, 58 to determine when recirculation occurs.

The ink supply bottle 52 is not considered an ink supply tank as used throughout this description and the claims. Rather, the recirculation system and the recirculation path thereof is devoid of an ink supply tank. In one embodiment, the ink supply bottle can be a vessel that the ink is purchased/supplied in and is intended to be disposed of after use. In another embodiment, the ink supply bottle can be any form of single use vessel that is intended to be disposed of after use. An ink supply tank (also referred to as a recirculation tank or bulk tank) is a fixed component in a system that is designed to be filled with ink from a source of ink, and the tank is not easily removable and is not intended to be discarded after use when the ink runs out.

In the embodiment illustrated in FIG. 2, the ink supply bottle 52 includes a quick-disconnect fluid fitting 53 that connects to the recirculation flow path between the return pump 58 and the supply pump 48. In use, the ink supply bottle 52 can be mounted vertically with the quick-disconnect fluid fitting 53 at the lowest point, and when the ink supply bottle 52 is present in the recirculation flow path, ink can be taken out of the bottle and returned back into the bottle 52 via the quick-disconnect fluid fitting 53. Since particles in the ink will settle with time, recirculating the ink back into the bottle 52 at the lowest point allows the particles to be mixed back into the ink within the bottle 52.

When the ink supply bottle 52 is not present, the ink is recirculated from the header tank 54 to the header tank 44. In particular, when the ink supply bottle 52 is removed, the quick-disconnect fluid fitting 53 is closed, and the recirculating ink flows from the return pump 58 to the supply pump 48 and from there into the header tank 44. Either one of the pumps 48, 58, or both of the pumps 48, 58 operating simultaneously, can be used to pump the recirculating ink from the header tank 54 to the header tank 44. The pumps 48, 58 can be configured as "free-flow" pumps that are configured to permit flow of the ink through the pumps 48, 58 when the pumps are in their off-state.

In the system 12 illustrated in FIG. 2, the ink is removed from and returned back into the ink supply bottle 52 via the same port, which can be referred to an input/outlet port. In an alternative construction of the system 12 illustrated in FIG. 3, the ink supply bottle 52 can have a dual ported design, with one port 66 for removing ink from the bottle 52 and one port 68 for returning ink back into the bottle 52. In one embodiment, the port 66 and the port 68 can be at the same end of the bottle 52, for example the ports 66, 68 can both be at the bottom of the bottle 52.

Returning to FIG. 2, the vacuum system 34 is conventional in construction and need not be described in detail. The vacuum system 34 is configured to apply a vacuum to the nozzles of the print head 30 to establish the desired meniscus on the ink in the nozzles. The vacuum system 34 includes a pressure dampening container 70 (or pressure damper container) connected to a vacuum pump 72. The dampening container 70 has a slow leak to it to enable excess vacuum to dissipate. Further details on the vacuum system 34 can be found in U.S. Published Application No. 2020/0039228 the entire contents of which are incorporated herein by reference.

A vacuum line 74 extends between the header tank 44 and the header tank 54, and a valve 82, such as a solenoid valve, is provided in the vacuum line 74. The valve 82 is used to isolate the header tank 54 from the vacuum system 34, which is required during certain maintenance routines such as during an auto fill, auto drain, purge, and the like. Further information on auto fill, auto drain, purge, and other maintenance routines are disclosed in U.S. Published Application No. 2019/0344565, and U.S. Published Application No. 2020/0039228, each of which are incorporated herein by reference in their entirety.

A waste collection system 90 is connected to the cap tray 36 to collect ink that may be discharged into the cap tray 36. The waste collection system 90 includes a waste manifold 92 that is fluidly connected to the cap tray 36 via a fluid line, and a waste pump 94 is provided in the fluid line that pumps waste ink from the cap tray 36 into the manifold 92. The waste collection system 90 further includes a system drain line 100 that extends from the valve 51 to the waste manifold 92. A system drain pump 102 is provided in the drain line 100. The pump 102 can be used to drain the entire ink system including, but not limited to, the print head 30, the header tanks 44, 54, the filter 50, and the supply bottle 52. The pump 58 can be run simultaneously as the pump 102 (but at a lesser flow rate) in order to drain the system.

In addition, the waste collection system 90 can include a waste collection container 96 into which waste ink from the waste manifold 92 can be collected. The waste collection container 96 can be connected to the system using a quick connect fitting to simplify installation and removal of the container 96. However, one consequence of this type of connection is if the user fails to install the container 96 into the quick connect fitting, there is potential to build pressure. To address this, a pressure switch 98 is provided which detects a build-up of pressure resulting from forgetting to connect the waste collection container 96, where the pressure switch 98 will send a signal to the controller 60 once a certain pressure is reached to warn the user of the pressure increase and/or to warn the user to install the waste collection container 96.

In operation of the system 12 in FIGS. 2 and 3, and assuming the ink supply bottle 52 is present, if the header tank 44 is empty or otherwise needs to be refilled with ink, the supply pump 48 is operated to draw ink directly from the supply bottle 52 to fill the header tank 44. When the header tank 54 becomes full, the return pump 58 is operated to pump ink from the header tank 54 directly back into the supply bottle 52. The check valves 46, 56 control the direction of ink flow. The spring pressures acting on the check valves 46, 56 are such that while the return pump 58 is operating, the check valve 46 forces the returning ink to flow into the supply bottle 52. When the supply pump 48 is operating, the check valve 56 forces ink to be drawn from the supply bottle 52 instead of from the header tank 54. When the bottle 52 is removed, pressure builds and the springs of the check valves 46, 56 allow the valves 46, 56 to open to allow ink to flow directly from the header tank 54 to the header tank 44 (regardless of whether one of the pumps 48, 58 or both of the pumps 48, 58 are running). The return of the ink back into the supply bottle 52 causes mixing of the ink in the supply bottle 52. This mixing can be referred to as global mixing or in-bottle mixing. The mixing or agitation of the ink can be modified, for example increased or decreased, by controlling the speed and/or size of the return pump 58.

When the ink supply bottle 52 is removed, for example by a user while installing a new ink supply bottle, a deadhead is created where the quick disconnect fluid fitting is suddenly closed. In this situation, if the return pump 58 is operated, the pressure of the returning ink is sufficient to overcome the check valve 46 and a "local" recirculation is achieved by recirculating the ink through the system, for example from the header tank 54 to the header tank 44, and from the header tank 44 to the header tank 54 via the print head 30. This can be referred to as local mixing or out-of-bottle mixing.

In the case of local recirculation when the supply bottle 52 is not present, the ink must be recirculated directly from the header tank 54 into the header tank 44. Therefore, the header tank 44 must be configured to accommodate the recirculating ink from the header tank 54 even if the ink level sensor 64 indicates that the header tank 44 is full. In the example illustrated in FIGS. 2 and 3, in one embodiment, assuming that the ink level sensor 64 is a float switch, a significant amount of overhead is provided in the header tank 44 that allows the float switch to continue to rise even after the float switch indicates that the header tank 44 has reached its nominal full capacity level. Accordingly, the header tank 44 has capacity to receive ink from the header tank 54 to fill the header tank 44 past its nominal full capacity level. Without this additional capacity of the header tank 44, the header tank 44 could overflow into the vacuum system 34 when ink is recirculated into the header tank 44 from the header tank 54.

In some embodiments, the ink supply bottle 52 can be provided with a radio frequency identification (RFID) element. The RFID element can have data stored thereon, such as an estimate of the amount of ink remaining in the supply bottle 52. The ink remaining data can be updated during use as ink is supplied from or returned back into the supply bottle 52. Other data that can be stored on the RFID element can include, but is not limited to, the type of ink, the color of the ink, the manufacturer of the ink, a "date of birth" of the ink indicating when the ink was created and/or first introduced into the bottle 52, suggested operating parameters of the print head 30 for the specific ink in the bottle 52, and the like. Data can be read from and/or written to the RFID element using a suitable read/write device in the card processing system 10 or in the card printing system 12.

In one embodiment, the RFID element on the supply bottle 52 can be used to control the return pump 58. For example, the RFID element can be used to control the speed of the return pump 58 based on the estimated amount of ink that remains in the supply bottle 52. When the amount of remaining ink is lower, the speed of the return pump 58 can be reduced since the recirculating ink being returned back into the supply bottle 52 does not need to be returned with as much force in order to achieve adequate mixing. In contrast, when the amount of remaining ink is higher, the speed of the return pump 58 is increased since the recirculating ink being returned back into the supply bottle 52 needs to be returned with higher force in order to achieve adequate mixing.

FIG. 4 illustrates another embodiment of the DOD card printing system 12 that is similar to the DOD card printing system 12 in FIGS. 2 and 3, and like elements are referenced using the same reference numbers, some of which are increased by "-2". The system 12 in FIG. 4 employs what can be referred to as an active mix in supply bottle design where controllable valves are used to dictate whether mixing occurs within the supply bottle 52 or whether local recirculation/mixing takes place.

In particular, referring to FIG. 4, the ink delivery system 32-2 includes a pair of controllable valves **110*a*, 110*b*, for example three-way solenoid valves, a single pump 112, and a check valve 114 between the header tanks 44, 54 and the supply bottle 52. The valves 110*a*, 110*b* are configured to have at least three states that provide at least three flow paths for the ink. The first state of the valves 110*a*, 110*b* is when the supply header 44 needs ink, in which case both of the valves 110*a*, 110*b* are set to allow ink to be pumped by the pump 112 from the supply bottle 52 to the header tank 44. The second state of the valves 110*a*, 110*b* is when the header tank 54 is full, in which case the valves 110*a*, 110*b* must be set to allow ink to be pumped by the pump 112 from the header tank 54 into the supply bottle 52. The third state of the valves 110*a*, 110*b* is when the supply bottle 52 is removed, in which case the valves 110*a*, 110*b* must be set to allow ink to be pumped by the pump 112 from the header tank 54 into the header tank 44 for local recirculation. The check valve 114 is provided in order to prevent excess pressure build-up in the event that the valves 110*a*, 110*b* are set to pump into the supply bottle 52 when the supply bottle 52** is not actually present.

The system 12 in FIG. 4 also includes an isolation valve 76 in the vacuum system (a similar isolation valve is illustrated in FIG. 2) which can be, for example, a solenoid valve. The isolation valve 76 provides the ability to isolate the ink delivery system 32-2 from the vacuum system 34-2, and helps to maintain vacuum in the event of a power loss. However, in a recirculating ink delivery system, such as the system 32-2, it is desirable to always have a sufficient amount of dampening (regardless of the state of the isolation valve 76) due to the fact that adding and subtracting ink can cause significant pressure variations. This can cause an issue when the isolation valve 76 is closed and the recirculation of the ink continues. Since there is no damping (due to the isolation valve 76 being closed which isolates the dampening container 70 from the ink delivery system 32-2), the pump 112 can cause large and abrupt spikes in pressure, which can disturb the meniscus in the nozzles and cause poor resulting print quality.

Therefore, as illustrated in FIG. 4, a second dampening volume 80 (or second pressure damper container) is provided in the ink delivery system 32-2 downstream of the isolation valve 76. For example, the second dampening volume 80 can be fluidly connected to the header tank 44, for example to a fluid line between the header tank 44 and the isolation valve 76. In addition, the second dampening volume 80 is fluidly connected to the header tank 54 via the vacuum line 74 with the valve 82. The second dampening volume 80 is sealed without a slow leak in order to preserve the ability of the second dampening volume 80 to maintain vacuum in a power loss. The isolation valve 76 and the second dampening volume 80 can be utilized in the embodiments illustrated in FIGS. 2 and 3.

The system 12 in FIG. 4 includes the valve 51, the system drain line 100 and the system drain pump 102 described with respect to FIG. 2.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A drop-on-demand card printing system, comprising:

a drop-on-demand print head having an ink inlet and an ink outlet;

an ink delivery system connected to the drop-on-demand print head, the ink delivery system includes:

a first ink header tank fluidly connected to the ink inlet and a second ink header tank fluidly connected to the ink outlet;

an ink recirculation system defining an ink recirculation path that is configured to permit ink recirculation through the second ink header tank and the first ink header tank, the drop-on-demand card printing system is devoid of an ink supply tank;

the ink recirculation system includes a single use ink bottle with an inlet and an outlet and containing ink therein;

a vacuum system fluidly connected to the first ink header tank and the second ink header tank and that applies a vacuum to the drop-on-demand print head;

wherein the ink recirculation system includes a supply pump fluidly connected to the first ink header tank and a return pump fluidly connected to the second ink header tank.

2. The drop-on-demand card printing system of claim 1, wherein the inlet and the outlet are at one end of the ink bottle.

3. The drop-on-demand card printing system of claim 1, wherein the ink comprises an ink with a particulate material in the ink.

4. The drop-on-demand card printing system of claim 1, wherein the ink comprises a white ink or a colored ink.

5. A drop-on-demand card printing system, comprising:

a drop-on-demand print head having an ink inlet and an ink outlet;

an ink delivery system connected to the drop-on-demand print head, the ink delivery system includes:

a first ink header tank fluidly connected to the ink inlet and a second ink header tank fluidly connected to the ink outlet;

an ink recirculation system defining an ink recirculation path that is configured to permit ink recirculation through the second ink header tank and the first ink header tank, the drop-on-demand card printing system is devoid of an ink supply tank;

the ink recirculation system includes a single use ink bottle with an inlet and an outlet and containing ink therein;

a vacuum system fluidly connected to the first ink header tank and the second ink header tank and that applies a vacuum to the drop-on-demand print head;

wherein the first ink header tank has a nominal full capacity level, and the first ink header tank has capacity to receive ink from the second ink header tank to fill the first ink header tank past the nominal full capacity level.

6. A card processing system, comprising:

a card input that is configured to hold a plurality of plastic cards to be printed on; and a drop-on-demand card printing system downstream from the card input and receiving plastic cards that are input from the card input, the drop-on- demand card printing system comprises:

a drop-on-demand print head having an ink inlet and an ink outlet;

an ink delivery system connected to the drop-on-demand print head, the ink delivery system includes:

a first ink header tank fluidly connected to the ink inlet and a second ink header tank fluidly connected to the ink outlet;

an ink recirculation system defining an ink recirculation path that is configured to permit ink recirculation through the second ink header tank and the first ink header tank, the drop-on-demand card printing system is devoid of an ink supply tank;

the ink recirculation system includes a single use ink bottle with an inlet and an outlet and containing ink therein;

a vacuum system fluidly connected to the first ink header tank and the second ink header tank and that applies a vacuum to the drop-on-demand print head.

7. The drop-on-demand card printing system of claim 1, wherein the ink bottle includes a quick-disconnect fitting that forms the inlet and/or the outlet.

8. The drop-on-demand card printing system of claim 1, wherein the ink bottle includes a first quick-disconnect fitting that forms the inlet and a second quick-disconnect fitting that forms the outlet.

9. The drop-on-demand card printing system of claim 1, wherein the first ink header tank is fluidly connected to the ink inlet without a pump between the first ink header tank and the ink inlet.

10. The drop-on-demand card printing system of claim 1, wherein the second ink header tank is fluidly connected to the ink outlet without a pump between the second ink header tank and the ink outlet.

11. The drop-on-demand card printing system of claim 1, wherein the supply pump and the return pump are both disposed in a fluid path between the first ink header tank and the second ink header tank.

* * * * *